United States Patent [19]
Abe

[11] Patent Number: 5,666,209
[45] Date of Patent: Sep. 9, 1997

[54] IMAGE SIGNAL PROCESSING DEVICE

[75] Inventor: Nobuaki Abe, Sapporo, Japan

[73] Assignee: Asahi Kogaku Kogyo Kabushiki Kaisha, Tokyo, Japan

[21] Appl. No.: 275,355

[22] Filed: Jul. 15, 1994

[30] Foreign Application Priority Data

Jul. 15, 1993 [JP] Japan .................. 5-197993
Jun. 20, 1994 [JP] Japan .................. 6-160554

[51] Int. Cl.$^6$ .................................................. H04N 5/76
[52] U.S. Cl. .................. 386/109; 348/397; 348/405; 348/412; 386/112
[58] Field of Search .................. 358/335, 310; 360/33.1, 8, 9.1; 348/390, 395–398, 400–405, 409–412, 419, 420

[56] References Cited

U.S. PATENT DOCUMENTS

| | | | |
|---|---|---|---|
| 5,173,773 | 12/1992 | Ueda et al. ............ | 348/412 |
| 5,410,307 | 4/1995 | Hekstra et al. ......... | 348/412 |
| 5,412,428 | 5/1995 | Tahara ................... | 348/395 |
| 5,497,246 | 3/1996 | Abe ....................... | 348/405 |

OTHER PUBLICATIONS

U.S. Patent Application S.N. 08/252,172, filed Oct. 17, 1994.
U.S. Patent Application S.N. 08/257,357 filed Jul. 15, 1994.

*Primary Examiner*—Thai Q. Tran
*Assistant Examiner*—Khoi Truong
*Attorney, Agent, or Firm*—Greenblum & Bernstein, P.L.C.

[57] ABSTRACT

An image signal processing device generates first image data and second image data based on the same optical image. Each pixel of the second image data is offset from the corresponding pixel of the first image data by half the distance between the centers of two adjacent pixels. The first image data is then subjected to a discrete cosine transformation (DCT), quantization, and Huffman encoding, and is recorded to an IC memory card. High resolution image data is generated based on the first and second image data. Expanded image data is obtained based on the first image data, and supplementary data is generated based on the high resolution image data and the expanded image data. The supplementary data is subjected to DCT, quantization and Huffman encoding, and is recorded to the same IC memory card.

16 Claims, 10 Drawing Sheets

Fig. 3

8 × 8 PIXEL BLOCK (FIRST IMAGE DATA)

$$P_{xy} = \begin{bmatrix} 159 & 153 & 158 & 152 & 140 & 138 & 132 & 132 \\ 164 & 162 & 162 & 157 & 151 & 142 & 134 & 132 \\ 167 & 168 & 161 & 160 & 158 & 145 & 139 & 134 \\ 164 & 168 & 161 & 166 & 162 & 152 & 149 & 141 \\ 171 & 166 & 168 & 167 & 163 & 162 & 157 & 151 \\ 173 & 164 & 169 & 170 & 166 & 166 & 162 & 161 \\ 175 & 169 & 172 & 176 & 174 & 172 & 174 & 166 \\ 173 & 172 & 175 & 173 & 180 & 181 & 177 & 172 \end{bmatrix}$$

⇩ DCT

DCT COEFFICIENT $$S_{uv} = \begin{bmatrix} 260 & 49 & -16 & 5 & 2 & 4 & 0 & 1 \\ -79 & 36 & -2 & -7 & 1 & -3 & -1 & -2 \\ 0 & -8 & 3 & -2 & -2 & 1 & 5 & 1 \\ -8 & -4 & 5 & -4 & 1 & 7 & 6 & -2 \\ -2 & -6 & -1 & 0 & -4 & -1 & 0 & -1 \\ -3 & -2 & -1 & -1 & 1 & 2 & -5 & -1 \\ -4 & -1 & 1 & 0 & 0 & -2 & 2 & 0 \\ 1 & 1 & 1 & 1 & -1 & 1 & 0 & 0 \end{bmatrix}$$

QUANTIZATION TABLE $$Q_{uv} = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

⇩ QUANTIZATION

QUANTIZED DCT COEFFICIENT $$R_{uv} = \begin{bmatrix} 16 & 4 & -2 & 0 & 0 & 0 & 0 & 0 \\ -7 & 3 & 0 & 0 & 0 & 0 & 0 & 0 \\ 0 & -1 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Fig. 4

GROUPING OF DIFFERENTIAL VALUE OF DC COEFFICIENT

| SSSS GROUP NUMBER | DC DIFFERENTIAL VALUE | ADDED BIT NUMBER |
|---|---|---|
| 0 | 0 | 0 |
| 1 | -1. 1 | 1 |
| 2 | -3. -2. 2. 3 | 2 |
| 3 | -7.. -4. 4.. 7 | 3 |
| 4 | -15.. -8. 8.. 15 | 4 |
| 5 | -31.. -16. 16.. 31 | 5 |
| 6 | -63.. -32. 32.. 63 | 6 |
| 7 | -127.. -64. 64.. 127 | 7 |
| 8 | -255.. -128. 128.. 255 | 8 |
| 9 | -511.. -256. 256.. 511 | 9 |
| 10 | -1023.. -512. 512.. 1023 | 10 |
| 11 | -2047.. -1024. 1024.. 2047 | 11 |

Fig. 5

CODE TABLE FOR DIFFERENTIAL DC COEFFICIENT

| SSSS | CODE LENGTH | CODE WORD |
|---|---|---|
| 0 | 2 | 00 |
| 1 | 3 | 010 |
| 2 | 3 | 011 |
| 3 | 3 | 100 |
| 4 | 3 | 101 |
| 5 | 3 | 110 |
| 6 | 4 | 1110 |
| 7 | 5 | 11110 |
| 8 | 6 | 111110 |
| 9 | 7 | 1111110 |
| 10 | 8 | 11111110 |
| 11 | 9 | 111111110 |

FOR LUMINANCE COMPONENT

Fig. 8

```
ZZ[ ]···0 RUN LENGTH    :  -   0   0   1   0   2   0   54

EFFECTIVE COEFFICIENT   : 16   4  -7   3  -2  -1  -1
         VALUE

DC VALUE[16]-PRECEDING DC[25]=DIFFERENTIAL[-9].SSSS=4.
             VALUE          DC VALUE
                            CODE WORD FOR SSSS→101
                                ADDITIONAL BIT→0110
ZZ01=[ 4].SSSS=[3]RUN LENGTH=[0].
                            CODE WORD FOR SSSS→100
                                ADDITIONAL BIT→100
ZZ02=[-7].SSSS=[3]RUN LENGTH=[0].
                            CODE WORD FOR SSSS→100
                                ADDITIONAL BIT→000
ZZ04=[ 3].SSSS=[2]RUN LENGTH=[1].
                            CODE WORD FOR SSSS→11011
                                ADDITIONAL BIT→11
ZZ05=[-2].SSSS=[2]RUN LENGTH=[0].
                            CODE WORD FOR SSSS→01
                                ADDITIONAL BIT→01
ZZ08=[-1].SSSS=[1]RUN LENGTH=[2].
                            CODE WORD FOR SSSS→11100
                                ADDITIONAL BIT→0
ZZ09=[-1].SSSS=[1]RUN LENGTH=[0].
                            CODE WORD FOR SSSS→00
                                ADDITIONAL BIT→0
EOB                         CODE WORD FOR EOB→1010

ENCODED DATA:1010110100100100000110111101011110000001010
```
100

```
ZZ[ ]··0 RUN LENGTH    :  -   0   0   1   0   2   0   54

EFFECTIVE COEFFICIENT  : 16   4  -7   3  -2  -1  -1
         VALUE
```

Fig. 10

| | D10' | A | | |
|---|---|---|---|---|
| $A_{00}$ | $A_{01}$ | $A_{02}$ | $A_{03}$ | |
| $A_{10}$ | | | | |
| $A_{20}$ | $A_{21}$ | $A_{22}$ | $A_{23}$ | |

| | D14 | B | | |
|---|---|---|---|---|
| $B_{00}$ | $B_{01}$ | $B_{02}$ | $B_{03}$ | |
| $B_{10}$ | $B_{11}$ | $B_{12}$ | $B_{13}$ | |
| $B_{20}$ | $B_{21}$ | $B_{22}$ | $B_{23}$ | |

↕ T

EXPANDED RESTORED IMAGE DATA

D12    A'

| $A_{00}$ | $\frac{(A_{00}+A_{01})}{2}$ | $A_{01}$ | $\frac{(A_{01}+A_{02})}{2}$ | $A_{02}$ |
|---|---|---|---|---|
| $A_{10}$ | $\frac{(A_{10}+A_{11})}{2}$ | $A_{11}$ | $\frac{(A_{11}+A_{12})}{2}$ | $A_{12}$ |
| $A_{20}$ | $\frac{(A_{20}+A_{21})}{2}$ | $A_{21}$ | $\frac{(A_{21}+A_{22})}{2}$ | $A_{22}$ |

HIGH RESOLUTION IMAGE DATA

D16(D16')    $(A+B) \times 2^H$

| $A_{00}$ | $B_{00}$ | $A_{01}$ | $B_{01}$ | $A_{02}$ |
|---|---|---|---|---|
| $A_{10}$ | $B_{10}$ | $A_{11}$ | $B_{11}$ | $A_{12}$ |
| $A_{20}$ | $B_{20}$ | $A_{21}$ | $B_{21}$ | $A_{22}$ |

SUPPLEMENT DATA

D18(D18')    $(A+B) \times 2^H - A' = B'$

| 0 | $B_{00} - \frac{(A_{00}+A_{01})}{2}$ | 0 | $B_{01} - \frac{(A_{01}+A_{02})}{2}$ | 0 |
|---|---|---|---|---|
| 0 | $B_{01} - \frac{(A_{10}+A_{11})}{2}$ | 0 | $B_{11} - \frac{(A_{11}+A_{12})}{2}$ | 0 |
| 0 | $B_{02} - \frac{(A_{20}+A_{21})}{2}$ | 0 | $B_{21} - \frac{(A_{21}+A_{22})}{2}$ | 0 |

| $A_{00}$ | $\frac{(A_{00}+A_{01})}{2}$ | $A_{01}$ | $\frac{(A_{01}+A_{02})}{2}$ | $A_{02}$ |
|---|---|---|---|---|
| $A_{10}$ | $\frac{(A_{10}+A_{11})}{2}$ | $A_{11}$ | $\frac{(A_{11}+A_{12})}{2}$ | $A_{12}$ |
| $A_{20}$ | $\frac{(A_{20}+A_{21})}{2}$ | $A_{21}$ | $\frac{(A_{21}+A_{22})}{2}$ | $A_{22}$ |
| $A_{30}$ | $\frac{(A_{30}+A_{31})}{2}$ | $A_{31}$ | $\frac{(A_{31}+A_{32})}{2}$ | $A_{32}$ |

A'

| $A_{00}$ | $\frac{(A_{00}+A_{01})}{2}$ | $A_{01}$ | $\frac{(A_{01}+A_{02})}{2}$ | $A_{02}$ |
|---|---|---|---|---|
| $\frac{(A_{00}+A_{10})}{2}$ | $\frac{(A_{00}+A_{01}+A_{10}+A_{11})}{4}$ | $\frac{(A_{01}+A_{11})}{2}$ | $\frac{(A_{01}+A_{02}+A_{11}+A_{12})}{4}$ | $\frac{(A_{02}+A_{12})}{2}$ |
| $A_{10}$ | $\frac{(A_{10}+A_{11})}{2}$ | $A_{11}$ | $\frac{(A_{11}+A_{12})}{2}$ | $A_{12}$ |
| $\frac{(A_{10}+A_{20})}{2}$ | $\frac{(A_{10}+A_{11}+A_{20}+A_{21})}{4}$ | $\frac{(A_{11}+A_{21})}{2}$ | $\frac{(A_{11}+A_{12}+A_{21}+A_{22})}{4}$ | $\frac{(A_{12}+A_{22})}{2}$ |
| $A_{20}$ | $\frac{(A_{20}+A_{21})}{2}$ | $A_{21}$ | $\frac{(A_{21}+A_{22})}{2}$ | $A_{22}$ |
| $\frac{(A_{20}+A_{30})}{2}$ | $\frac{(A_{20}+A_{21}+A_{30}+A_{31})}{4}$ | $\frac{(A_{21}+A_{31})}{2}$ | $\frac{(A_{21}+A_{22}+A_{31}+A_{32})}{4}$ | $\frac{(A_{22}+A_{32})}{2}$ |

A⊕B

| $A_{00}$ | $\beta_{00}$ | $A_{01}$ | $\beta_{01}$ | $A_{02}$ |
|---|---|---|---|---|
| $\alpha_{00}$ | $B_{00}$ | $\alpha_{01}$ | $B_{01}$ | $\alpha_{02}$ |
| $A_{10}$ | $\beta_{10}$ | $A_{11}$ | $\beta_{11}$ | $A_{12}$ |
| $\alpha_{10}$ | $B_{10}$ | $\alpha_{11}$ | $B_{11}$ | $\alpha_{10}$ |
| $A_{20}$ | $\beta_{20}$ | $A_{21}$ | $\beta_{21}$ | $A_{22}$ |

IMAGE SIGNAL PROCESSING DEVICE

BACKGROUND OF THE INVENTION

1. Field of the Invention

The present invention relates to an image signal processing device by which digital still image data of different resolutions are recorded on a recording medium, and by which the recorded still image data are read from the recording medium so that two images having the different resolutions can be reproduced.

2. Description of Related Art

Conventionally, there is known an electronic still camera in which a still image signal is converted to an electrical signal by an image sensor (CCD) and recorded on a magnetic disk or an optical disc according to the NTSC system, or another system, such as Hi-Vision (a high definition television system). The resolution of the NTSC system is lower than that of a high definition television system, and therefore, even if a first image signal recorded according to the NTSC system is converted to a second image signal according to the high definition television system, the resolution of the first image signal is not improved.

On the other hand, two kinds of image signals having different resolutions from each other can be recorded on a recording medium. According to such a construction, however, the amount of image signal recorded on the recording medium will be increased, and thus, it is difficult to record many images on a recording medium which has a fixed recording volume.

SUMMARY OF THE INVENTION

Accordingly, the present invention has an object to provide an image signal processing device which can record image signals having different resolutions in a recording medium without greatly increasing the amount of image signal on the recording mediums and can output the image signals so that a display device shows the images at the corresponding resolutions.

According to the present inventions there is provided an image signal processing device comprising first generating means, second generating means, third generating means, transforming means, subtracting means, data compression applying means, and recording means.

The first generating means generates first image data based on an optical image. The first image data has a first resolution. The second generating means generates second image data based on the optical image. The second image data is offset from the first image data by a predetermined amount on a spatial coordinate axis. The third generating means generates third image data based on the first and second image data. The third image data has a second resolution higher than the first resolution. The transforming means transforms the first image data into expanded image data having the same number of pixels as the third image data. The subtracting means subtracts the expanded image data from the third image data to generate supplementary data. The data compression applying means applies data compression to the first image data and the supplementary data. The recording means records the first image data and the supplementary data compressed by the recording means on a recording medium.

Further, according to the present invention, there is provided an image signal processing device comprising an image sensor, an A/D converter, a first expansion circuits a second expansion circuit, a subtractor, a data compression circuit, and a recording medium.

The image sensor generates an image signal corresponding to a subject and outputs image data. The A/D converter A/D converts the image data to generate first image data and second image data, each of which has a first resolution, and which are offset to each other by a predetermined amount on a spatial coordinate axis of the original image data. The first expansion circuit generates third image data based on the first and second image data. The third image data has a second resolution higher than the first resolution. The second expansion circuit performs an expansion process to transform the first image data to expanded image data that has the same number of pixels as the third image data. The subtractor subtracts the expanded image data from the third image data to generate supplementary data. The data compression circuit applies data compression to the first image data and the supplementary data. The first image data and the supplementary data compressed by the recording means are recorded in the recording medium.

BRIEF DESCRIPTION OF THE DRAWINGS

The present invention will be better understood from the description of the preferred embodiments of the invention set forth below, together with the accompanying drawings, in which:

FIG. 3 is a view showing an example of DCT (discrete cosine transformation) and quantization;

FIG. 4 is a view showing a group classification table of DC components used for Huffman encoding;

FIG. 5 is a view showing code words expressing group numbers;

FIG. 8 is a view showing an example of finding the encoded data from the quantized DCT coefficient;

FIG. 10 is a view showing an example of a high resolution image data generated based on first image data and second image data, and supplementary data, according to an embodiment of the first invention;

FIG. 12 is a view showing an example of data obtained by upsampling restored image data in a horizontal direction and a vertical direction according to the hierarchical process of the JPEG algorithm.

DESCRIPTION OF THE PREFERRED EMBODIMENTS

Figure 1:
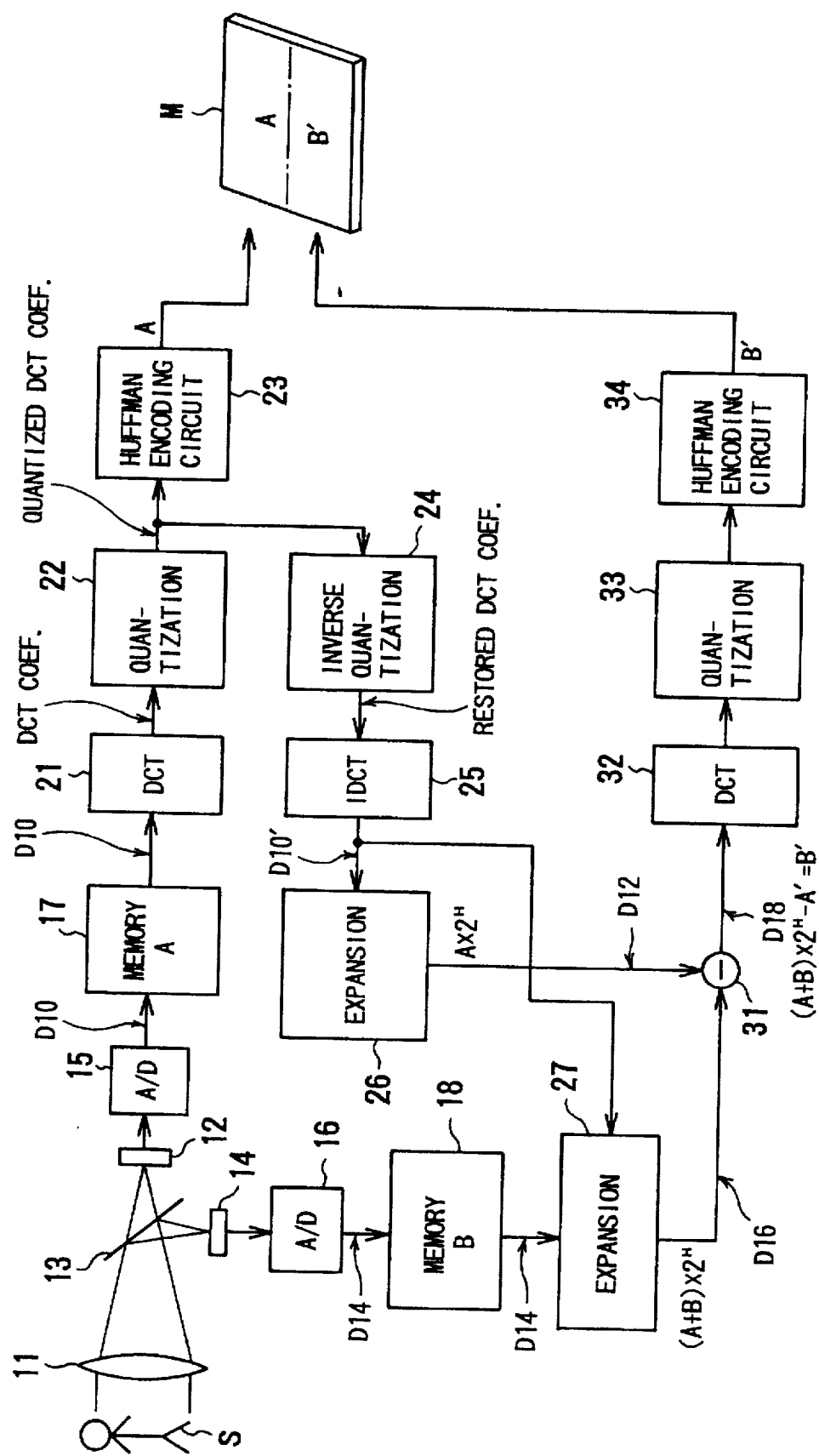
FIG. 1 is a block diagram of a recording system of an electronic still camera to which a first embodiment of the present invention is applied.

The present invention will now be described with reference to embodiments shown in the drawings.

FIG. 1 is a block diagram of a recording system of an electronic still camera to which a first embodiment of the present invention is applied.

Light coming from an object S to be photographed is focused by a focus lens 11. The optical image is focused on a light receiving surface of a CCD (charge coupled device) or an image sensor 12. A half-mirror 13 is provided between the focus lens 11 and the CCD 12, so that a part of light focused by the focus lens 11 is reflected and focused on a light receiving surface of a CCD or an image sensor 14.

A large number of photoelectric conversion elements are arranged on the light receiving surfaces of the CCDs 12 and 14. Each photoelectric conversion element corresponds to one pixel. The CCDs 12 and 14 are arranged in such a manner that a pixel of the electric conversion element of the CCD 12 and a pixel of the CCD 14 are offset to each other by half the distance between the centers of two adjacent pixels in a horizontal direction of the image formed on the CCDs 12 and 14.

The optical image generated on the CCD 12 is converted to an electrical signal by the photoelectric conversion elements and inputted to an A/D converter 15, so that the analog image signal is converted to first digital image data D10 for each pixel. Similarly, the analog image signal outputted from the CCD 14 is converted to second digital image data D14 for each pixel by an A/D converter 16. Each of the first and second image data has a first resolution according to a normal television mode such as the NTSC system.

The first image data D10 is subjected to a predetermined processing by a signal processing circuit, (not shown) and then, one frame's worth (or one field's worth) of image data is stored in an image memory 17. The second image data D14 is subjected to a predetermined processing by a signal processing circuit (not shown), and then, one frame's worth (or one field's worth) of image data is stored in an image memory 18.

The first image data D10 read out from the image memory 17 is subjected to data compression in a two-dimensional DCT (discrete cosine transformation) processing circuit 21, a quantization processing circuit 22 and a Huffman encoding processing circuit 23.

The first image data D10 is divided into a plurality of blocks and outputted to the DCT processing circuit 21 for each block. Each block is constituted by 8×8 pixels. The image data Pxy of this block consisting of 8×8 pixels is subjected to two-dimensional DCT in the DCT processing circuit 21 and transformed to a DCT coefficient. Namely, in the present embodiment, DCT is adopted as the orthogonal transform of the image data.

The DCT coefficient outputted from the DCT processing circuit 21 is inputted to the quantization processing circuit 22 for each 8×8 pixel block. The DCT coefficient is quantized using a predetermined quantization table in the quantization processing circuit 22, and thus, a quantized DCT coefficient is obtained.

The quantization processing circuit 22 is connected to the Huffman encoding processing circuit 23 and an inverse quantization processing circuit 24. The quantized DCT coefficient is Huffman-encoded by the Huffman encoding processing circuit 23 and converted to code words and then recorded in to a recording medium (such as, for example, an IC card memory) M as encoded data A. On the other hand, the quantized DCT coefficient is subjected to an inverse quantization in the inverse quantization processing circuit 24 by using the quantization table used in the quantization processing circuit 22, and thus the DCT coefficient is restored.

The restored DCT coefficient obtained by the inverse quantization processing circuit 24 is inputted to an IDCT processing circuit 25, in which an IDCT (inverse discrete cosine transformation) is carried out with respect to the restored DCT coefficient, whereby the first image data D10' is restored for each block consisting of 8×8 pixels.

The IDCT processing circuit 25 is connected to an expansion processing circuit 26. In the expansion processing circuit 26, an expansion process is carried out according to a hierarchical procedure of the JPEG (Joint Photographic Experts Group) with respect to the restored first image data D10'. In the expansion process in the embodiment, an upsampling is performed in a horizontal direction of the restored first image data D10' in such a manner that the number of pixels arranged in a horizontal direction is doubled, since the CCDs 12 and 14 are arranged in such a manner that the pixels of the CCDs 12 and 14 are offset to each other by half of the pixel pitch. Namely, restored expanded image data D12 is generated by the expansion process.

The IDCT processing circuit 25 is also connected to an expansion processing circuit 27 which is connected to the image memory 18. In the expansion processing circuit 27, third image data D16 having a second resolution higher than the first resolution is generated based on the restored first image data D10' inputted from the IDCT 25 and the second image data D14 inputted from the image memory 18. The expansion processing circuit 27 is connected to a subtractor 31 which is connected to the expansion processing circuit 26. In the subtractor 31, the expanded image data D12 inputted from the expansion processing circuit 26 is subtracted from the third image data D16 inputted from the expansion processing circuit 27, whereby supplementary data D18 is generated. The subtraction in the subtractor 31 is performed with respect to each corresponding pixel of the third image data D16 and the expanded image data D12.

The supplementary data D18 obtained by the subtractor 31 is inputted to a DCT processing circuit 32, in which a two-dimensional DCT is performed on the supplementary data D18 so that a DCT coefficient of the supplementary data D18 is obtained. The DCT coefficient of the supplementary data D18 is quantized in a quantization processing circuit 33, which is connected to a Huffmam encoding processing circuit 34. The quantized DCT coefficient of the supplementary data D18 is Huffman-encoded at the Huffman encoding processing circuit 34 and converted to code words and then recorded to the recording medium M as encoded data B'.

Figure 2:
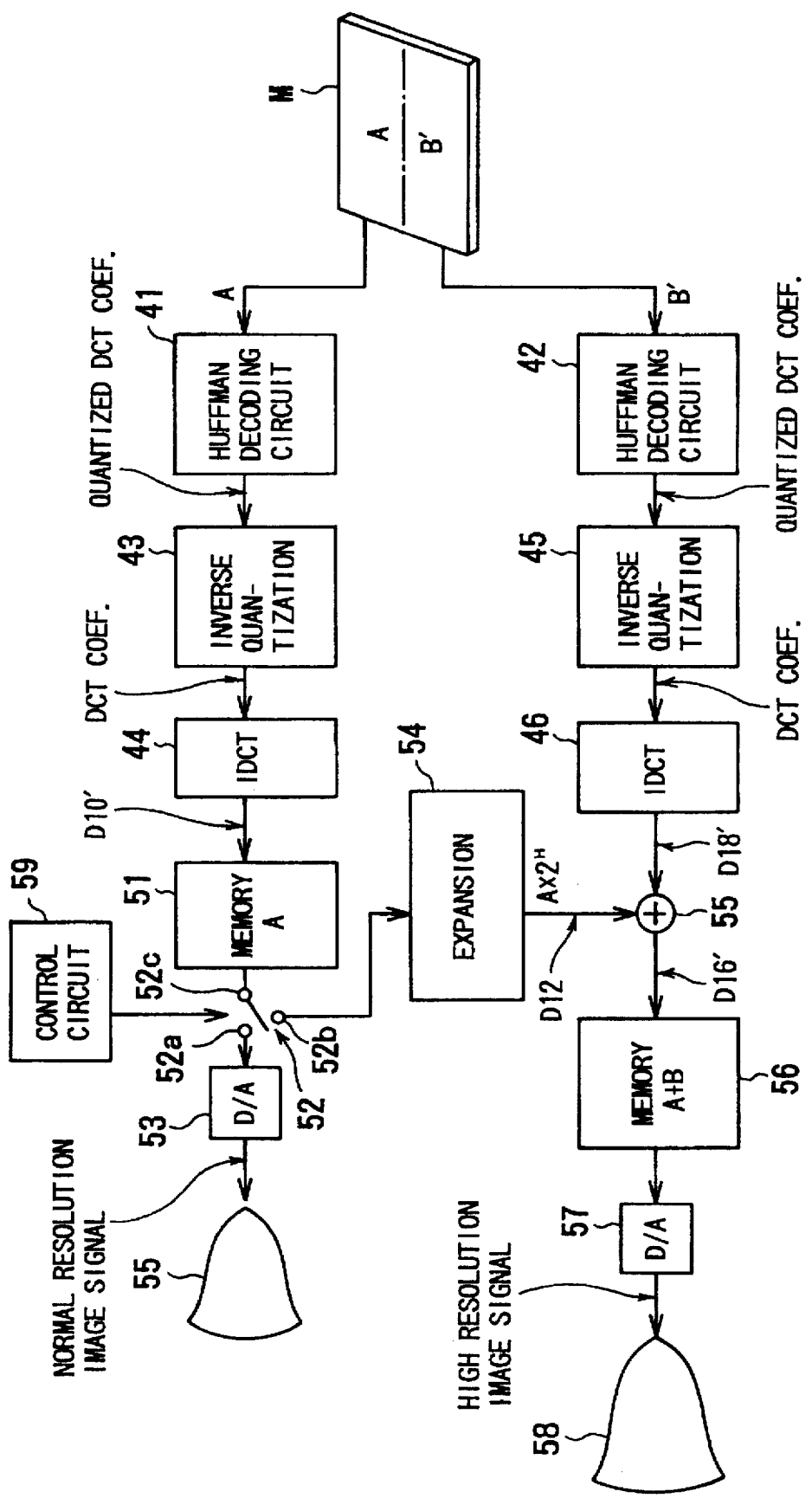
FIG. 2 is a block diagram of a reproducing system of the electronic still camera having the recording system shown in FIG. 1.

FIG. 2 is a block diagram of a reproducing system of the electronic still camera having the recording system shown in FIG. 1.

The encoded data A and B' read out from the recording medium M are inputted into Huffman decoding processing circuits 41 and 42, in which quantized DCT coefficients are decoded based on the encoded data A and B', respectively.

The quantized DCT coefficient obtained by the Huffman decoding processing circuit 41 is subjected to an inverse quantization in an inverse quantization processing circuit 43, whereby the DCT coefficient is restored. The restored DCT coefficient is inputted to an IDCT processing circuit 44 in which an inverse discrete cosine transformation is carried out with respect to the restored DCT coefficient, whereby the first image data D10' is restored.

Similarly, the quantized DCT coefficient obtained by the Huffman decoding processing circuit 42 is restored to the DCT coefficient by an inverse quantization processing circuit 45, and the restored DCT coefficient is subjected to an inverse discrete cosine transformation in an IDCT processing circuit 46, whereby supplementary data D18' is restored.

The restored first image data D10' is sequentially written to an image memory 51 and accumulated therein. The image memory 51 is connected to a common terminal 52c of a switch 52 which has a first terminal 52a connecting to a data input terminal of a D/A convertor 53 and a second terminal 52b connecting to an expansion processing circuit 54.

Switch 52 is swithced over by a control circuit 59 having a micro computer, according to recognition information described later, from which it is determined whether the encoded data B' is recorded to the recording medium M.

The D/A convertor 53 is connected to an output device 55, such as a display device, through an analog image signal output terminal provided on an outer surface of the housing of the electronic still camera. Therefore, when switch 52 is switched to the first terminal 52a, the restored first image data D10' read from the image memory 51 is converted to an analog signal by the D/A convertor 53, so that the reproduced image is shown on the output device 55 at the first resolution, such as the NTSC system.

When the switch 52 is switched to the second terminal 52b, the restored first image data D10' read from the image memory 51 is inputted to expansion processing circuit 54, in which expansion process is carried out according to the hierarchical procedure of the JPEG with respect to the restored first image data D10', similar to the expansion processing circuit 26. Namely, each pixel of the restored first image signal D10' is upsampled by two times in a horizontal direction, so that restored expanded image data D12 is generated.

The expansion processing circuit 54 and the IDCT processing circuit 46 are connected to an adder 55 so that the restored expanded image data D12 and the supplementary data D18' are inputted to the adder 55, respectively. In the adder 55, a pixel of the restored expanded image data D12 and the corresponding pixel of the supplementary data D18' are added to each other, and thus a third image data D16' having a higher resolution than the first resolution is restored. An output terminal of the adder 55 is connected to an image memory 56, so that the third image data D16' of high resolution is stored to the image memory 56.

One frame's worth (or one field's worth) of the high resolution image data D16' is read out from the image memory 56 and converted to an analog image signal of high resolution by a D/A convertor 57 which is connected to a high resolution image signal output device 58 through an analog image signal output terminal provided on an outer surface of the housing of the electronic still camera. Namely, the image is shown on the output device 58 at a second resolution higher than that of the output device 55.

Handling of data in each of the circuits shown in FIGS. 1 and 2 is described below.

FIG. 3 shows an example of the first image data D10 divided into a block consisting of 8×8 pixels. In the DCT processing circuit 21, the first image data D10 inputted thereto is subjected to the two-dimensional DCT transformation, and thus the DCT coefficient is obtained for each block, as shown in FIG. 3.

The two-dimensional DCT transformation is performed according to the following equation (1):

$$Suv = \frac{1}{4} CuCv \sum_{x=0}^{7} \sum_{y=0}^{7} (Pxy - Ls)\cos\frac{(2x+1)u\pi}{16} \cos\frac{(2y+1)v\pi}{16} \quad (1)$$

wherein x,y=position of pixel in block
u,v=position of DCT coefficient $$CuCv = 1/\sqrt{2} \quad ; u,v=0$$
$$= 1 \quad ; other$$

Ls=128; bit precision of Pxy=8 bit

Note, in the equation (1), Pxy indicates a value of each pixel of first image data D10, and is image data consisting of luminance signals of 256 gradations (8 bit precision). The DCT coefficient obtained by the DCT processing circuit 21 shows an amplitude spectral density. In case of a block consisting of 8×8 pixels, 64 (=8×8) of the DCT coefficient are obtained by the two-dimensional DCT transformation according to the equation (1). Among the 64 DCT coefficients, coefficient $S_{00}$, located at the element position (0,0), is a DC (Direct Current) component, and the remaining 63 coefficients are AC (Alternating Current) components. The AC components show how many higher frequency components exist in the original image as the coefficient is changed from $S_{10}$ to $S_{77}$ (=amplitude spectral density). Namely, the coefficient $S_{77}$ expresses the coefficient having the highest spatial frequency. The DC component shows a mean value of whole block of 8×8 pixels.

Note, in equation (1), Ls is subtracted from each pixel value Pxy, so that the expected value of the DC component becomes close to 0. Due to this, the DC componet can be encoded to a code word having a shorter length in the Huffman encoding, so that an efficiency of data compression of the image data is improved.

The DCT coefficients are inputted to the quantization processing circuit 22 in which a quantization table Quv, as shown in FIG. 3, is provided, and thus each of the DCT coefficients is quantized using the quantization table Quv.

The quantization is performed according to the following equation:

$$Ruv = \text{round }(Suv/quv) \quad \{0 \leq u, v \leq 7\}$$

The term "ground" in this equation means rounding to the closest integer. Namely, the quantized DCT coefficient Ruv as shown in FIG. 3 is obtained by division and rounding off between the respective elements of the DCT coefficients Suv and the respective elements of the quantization table Quv. The quantized DCT coefficient Ruv is inputted to the Huffman encoding processing circuit 23 and the Huffman encoding processing circuit 34.

The operation of Huffman encoding the quantized DCT coefficient Ruv will be explained referring to FIG. 4 to FIG. 8.

The encoding method differs between the DC component $R_{00}$ and AC component (the quantized DCT coefficient Ruv other than the DC component $R_{00}$). The encoding of the DC component $R_{00}$ is carried out as follows:

First, a difference value between the quantized DCT coefficient $R_{00}$ of the block to be encoded and the quantized DCT coefficient $R_{00}$ of the preceding encoded block is found. It is decided which of the groups shown in FIG. 4 this difference value belongs to. The code word expressing the number of that group is found from the code table (coding table of DC component) shown in FIG. 5. For example, when the quantized DCT coefficient $R_{00}$ of the block to be encoded is 16 and the quantized DCT coefficient $R_{00}$ of the preceding encoded block is 25, the difference value is −9, and therefore it is decided that group number (SSSS) of the group to which the difference value=−9 belongs is "4" from the group number table of FIG. 4. Further, it is decided that the code word of that group number (SSSS) is "101" from the code table of FIG. 5.

Subsequently, the order of the difference value in that group in the group number table of FIG. 4 is expressed by an additional bit. For example, the difference value=−9 is seventh in order from the smallest (i.e., −15, −14, −13, −12, −11, −10, −9 equals seventh from the smallest (−15) in the group of the group number (SSSS)=4, and therefore the additional bit becomes "0110" (base 2 notation, where the first difference is equal to 0000; the second difference is equal to 0001; the third difference is equal to 0010; the fourth difference is equal to 0011; the fifth difference is equal to 0100; the sixth difference is equal to 0101; and the seventh difference is equal to 0110). Namely, the Huffman encoded word for the quantization DC component $R(Y)_{00}$ of the block which is now being encoded becomes "1010110".

Figure 6:
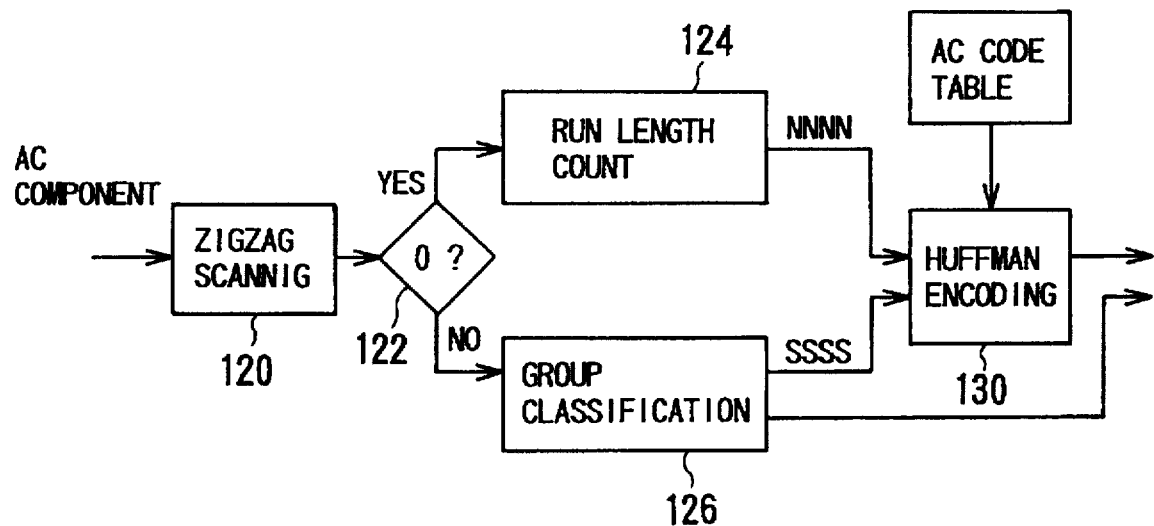
FIG. 6 is a flowchart showing a processing routine of a Huffman encoding of AC component.
Figure 7:
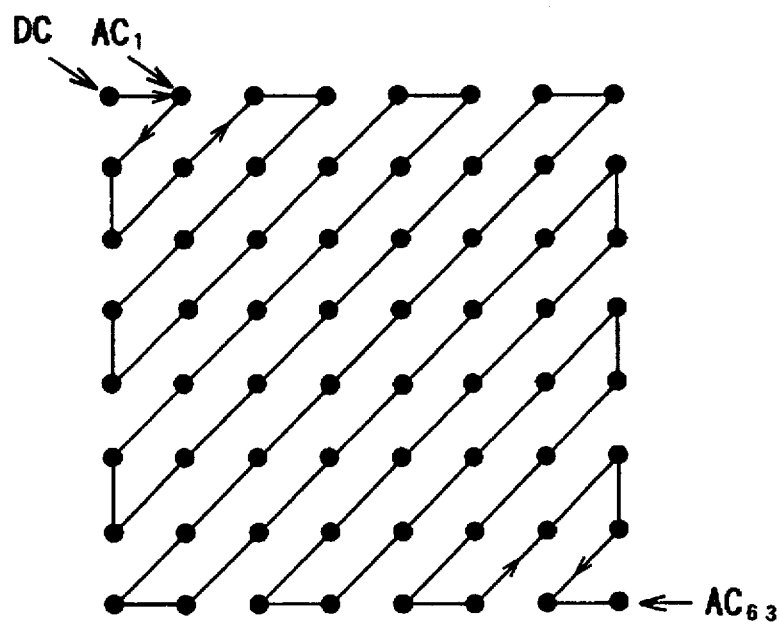
FIG. 7 is a view showing a zigzag scanning used when encoding AC components among the DCT coefficients.

On the other hand, the encoding of the AC component of the quantized DCT coefficient is performed by the processing routine shown in FIG. 6. In Step 120, 63 quantized DCT coefficients are subjected to a zigzag scanning in the order shown in FIG. 7 and rearranged into a one-dimensional array of data. Then, it is decided in Step 122 whether the respective quantized DCT coefficient values arranged in one dimension are "0". When any quantized DCT coefficient is "0", Step 124 is executed so that the quantized DCT coefficients which are "0" are counted. By this, the length of the continuous "0"s, that is, the run length (NNNN) is obtained.

Contrary to this, when it is determined in Step 122 that the quantized DCT coefficient is not "0", in Step 126, the group classification, similar to that for the DC component, is carried out and, at the same time, the additional bit is obtained. The group classification of the quantized DCT coefficient of the AC component differs from the group classification of the DC component and is carried out for the quantized DCT coefficient thereof per se. Namely, when the quantized DCT coefficient is for example "4", a group number (SSSS) "3" is obtained by referring to a table in the same way as in FIG. 4. Since the quantized DCT coefficient "4" exists at fifth place from the smallest in the group of the group number (SSSS)=3 (i.e., −7, −6, −5, −4, 4 equals fifth place using a table in the same way as in FIG. 4), the additional bit becomes "100".

Subsequently, in Step 130, AC code table (not shown) is referred to, and, for example, where the run length of data immediately before the quantized DCT coefficient of "4" is "0", the code word "100" is obtained based on this run length and the group number (SSSS)=3. Then, by combining this code word "100" and the additional bit "100" obtained in Step 126, the two-dimensional Huffman encoding word "100100" is obtained.

The result of performing the Huffman encoding for the quantized DCT coefficient of FIG. 3 is indicated as the encoded data 100 of FIG. 8. The encoded data 100 are sequentially recorded on the IC memory card M.

Figure 9:
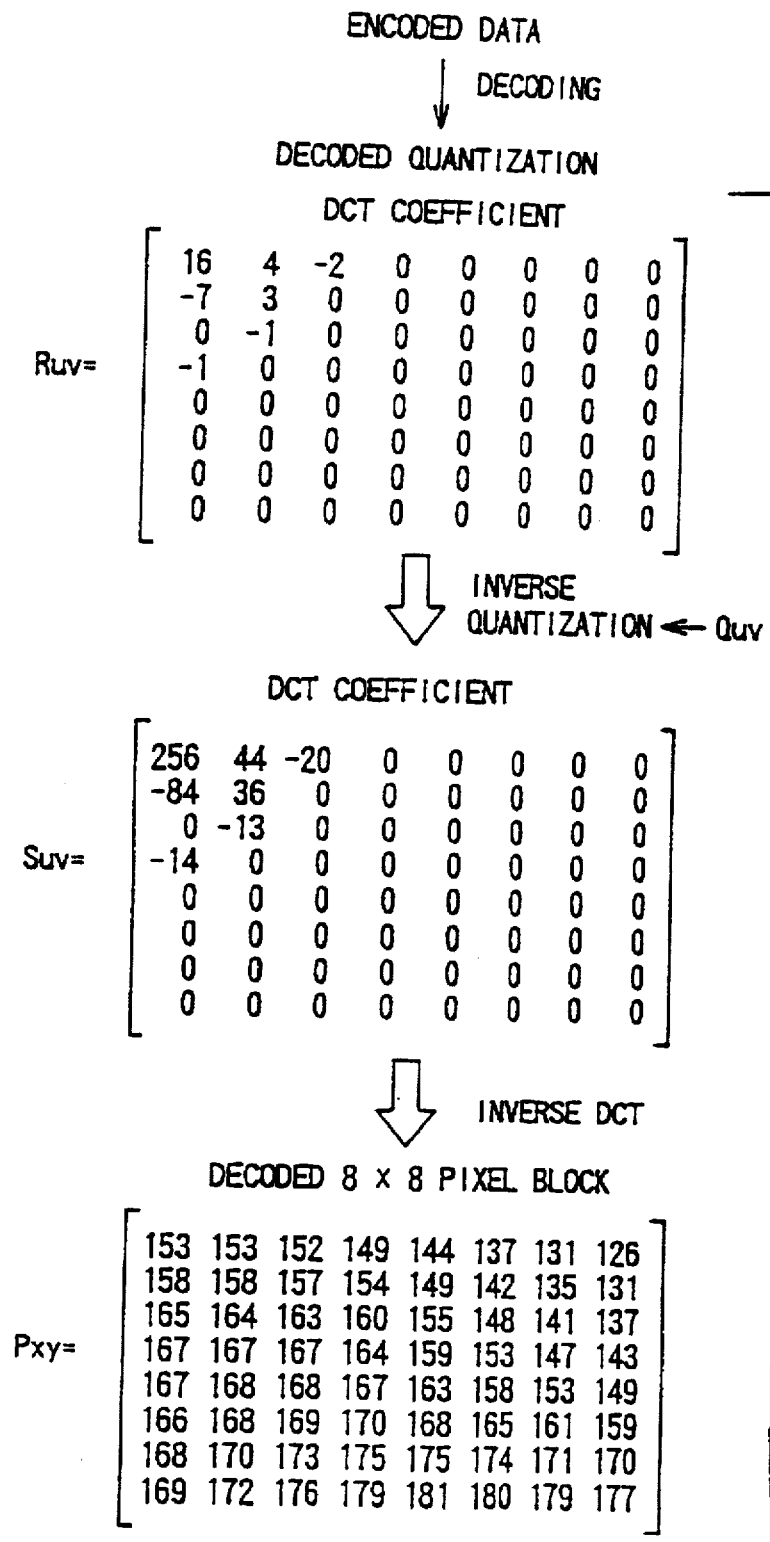
FIG. 9 is a view showing an example of decoding the image data by IDCT (inverse discrete cosine transformation) and inverse quantization from the encoded data.

The quantized DCT coefficient outputted from the quantization processing circuit 22 is also inputted to the inverse quantization processing circuit 24, so that the quantized DCT coefficient is restored to the DCT coefficient by using the quantization table Quv used in the quantization processing circuit 22. FIG. 9 shows the restored DCT coefficient Suv which is obtained by performing inverse-quantization with respect to the quantized DCT coefficient Ruv shown in FIG. 3. The restored DCT coefficient Suv is inputted to the IDCT processing circuit 16, in which the restored DCT coefficient Suv is subjected to two-dimensional IDCT transformation, so that the first image data D10' is restored.

The two-dimensional IDCT transformation is performed according to the following equation (2):

$$P_{xy} = \frac{1}{4} \sum_{u=0}^{7} \sum_{v=0}^{7} C_u C_v S_{uv} \cos\frac{(2x+1)u\pi}{16} \cos\frac{(2y+1)v\pi}{16} + L_s \quad (2)$$

wherein x,y=position of pixel in block
u,v=position of DCT coefficient $$C_u, C_v = 1/\sqrt{2} \quad ; u,v=0$$
$$\quad\quad\quad = 1 \quad ; \text{other}$$

Ls=128; bit precision of Pxy=8 bit

The first image data D10' restored by performing the two-dimensional IDCT transformation with respect to the DCT coefficient Suv is shown in FIG. 9.

The restored first image data D10' is inputted into the expansion processing circuit 26, in which the expansion process according to the hierarchical procedure of the JPEG algorithm is performed so that the number of pixels of the restored first image data D10' is doubled in a horizontal direction of the original image data generated by the CCD 12 or 14. FIG. 10 shows an example of the first image data D10' restored by the IDCT processing circuit 25 or 44, and an example of the restored expanded image data D12 generated by the expansion processing circuit 26 or 54. As shown in FIG. 10, the upsampling in the horizontal direction according to the hierarchical procedure is performed in such a manner that, in the expanded image data D12, a value of a pixel is defined as a mean value of two pixels adjacent thereto.

The first image data D10, which is generated by the CCD 12 and A/D converted by the A/D convertor 15, and the second image data D14, which is generated by the CCD 14 and A/D converted by the A/D convertor 16, are offset to each other by half of a distance between the centers of two adjacent pixels in a horizontal direction of the image data D10 and D12 as shown by reference T in FIG. 10. The second image data D10 and the restored first image data D10' outputted from the IDCT processing circuit 25 are inputted to the expansion processing circuit 27, in which the first and second image data D10' and D14 are arranged in the horizontal direction in such a manner that a pixel of the restored first image data D10' and a pixel of the second image data D14 are alternately disposed in a horizontal direction, and thus, the third image data D16 is generated as shown in FIG. 10.

In the subtractor 31, a subtraction is performed with respect to each corresponding pixel of the expanded image data D12 and the third image data D16, and thus, the supplementary data D18 for reproducing a high resolution image data is generated as shown in FIG. 10 and inputted to the DCT processing circuit 32.

In the DCT processing circuit 32, the supplementary data D18 is transformed to the DCT coefficients, which are inputted to the quantization processing circuit 33 in which each of the DCT coefficients is quantized by using a quantization table different from the quantization table Quv used in the quantization processing circuit 22. The reason why these quantization tables are different from each other is that a distribution of values of the DCT coefficients, i.e., statistical characteristics of the DCT coefficients are different from each other. Namely, the step width for quantization in the quantization table used in the quantization processing circuit 22 may be changed in accordance with the original image data outputted from the CCD 12.

The quantized DCT coefficient obtained by the quantization processing circuit 33 is inputted to the Huffman encoding processing circuit 34, in which the Huffman encoding is performed as in the Huffman encoding processing circuit 23, and thus, the encoded data B' is generated. Note, a Huffman table used in the Huffman encoding processing circuit 34 is different from a Huffman table used in the Huffman encoding processing circuit 23. The reason is described below.

The quantized DCT coefficient inputted to the Huffman encoding processing circuit 23 is obtained based on the first image data D10 which corresponds to the original image, and the quantized DCT coefficient inputted to the Huffman encoding processing circuit 34 is obtained based on the supplementary data D18 for reproducing a high resolution image. The first image data D10 has different statistical characteristics from that of the supplementary data D18. Therefore, there is a difference in the statistical characteristics between the two quantized DCT coefficients, and thus, the Huffman tables used in the Huffman encoding processing circuits 23 and 34 are different.

The encoded data B' is recorded on the IC memory card M with the encoded data A. Note, when the encoded data A and B' are recorded to the IC memory card M, recognition information is also recorded to the IC memory card M, so that it is determined whether the data read out from the IC memory card M is the encoded data A or the encoded data B'.

A process in which the encoded data A and/or B' are read from the IC memory card M to reproduce the image data is described below with reference to FIGS. 2 and 9. Note, when high resolution image data is reproduced, both of the encoded data A and B' are read from the IC memory card M. Conversely, when a normal resolution image data is reproduced, the encoded data B' need not be read from the IC memory card M.

The encoded data A and B' are read out from the IC memory card M according to the recognition information recorded when the data A and B' are recorded on the IC memory card M, and inputted to the Huffman decoding processing circuits 41 and 42, respectively.

In the Huffman decoding processing circuit 41, the quantized DCT coefficient Ruv is decoded by using the Huffman table used in the Huffman encoding processing circuit 23. FIG. 9 shows the quantized DCT coefficient Ruv obtained by decoding the encoded data 100 shown in FIG. 8, which is an example of the encoded data A read from the IC memory card M.

The quantized DCT coefficient is inputted to the inverse quantization processing circuit 43, in which the inverse-quantization is performed by using a quantization table used in the quantization processing circuit 22. Namely, the quantization table Quv is multiplied by each of the restored quantization DCT coefficients Ruv for each element, and thus, the DCT coefficient Suv is restored as shown in FIG. 9. Note, the quantization table used in the IDCT processing circuit 43 is the same as the quantization table used in the inverse quantization processing circuit 24.

The DCT coefficient restored by the inverse quantization processing circuit 43 is inputted to the IDCT processing circuit 44, in which the DCT coefficient is subjected to a two-dimensional IDCT transformation, and thus, the restored image data D10' (Pxy) as shown in FIG. 9 is restored. This restored image data D10' is substantially the same as the restored image data obtained by the IDCT processing circuit 25. Therefore, the inverse quantization circuit 43 can serve as the inverse quantization circuit 24, and the IDCT processing circuit 44 can be served as the IDCT processing circuit 25. In the embodiment, these are separate circuits for convenience of explanation.

The restored image data D10' obtained by the IDCT processing circuit 44 is inputted to the image memory 51. When storing of one frame's worth (or one field's worth) of the image data D10' in the image memory 51 has been completed, the restored image data D10' is transferred from the image memory 51 to the D/A convertor 53 or the expansion processing circuit 54, depending upon the state of the switch 52.

When the restored image data D10' is inputted to the D/A converter 53, the restored image data D10' is converted to analog data and outputted to the output device 55, so that the image having a normal resolution (the first resolution) is shown on the output device 55. Conversely, when the restored image data D10' is inputted to the expansion processing circuit 54, each pixel of the restored image data D10' is expanded in a horizontal direction based on the hierarchical procedure of the JPEG algorithm, and the restored image signal D12 is obtained as shown in FIG. 10. The expanded restored image signal D12 is inputted to the adder 55.

On the other hand, the encoded data B' read out from the IC memory card M is decoded by the Huffman decoding processing circuit 42. The Huffman table used in the Huffman decoding processing circuit 42 is the same as that used in the Huffman encoding processing circuit 34. The restored quantized DCT coefficient obtained by the Huffman decoding processing circuit 42 is subjected to an inverse quantization in the inverse quantization processing circuit 45, and thus, the DCT coefficient is restored. The quantization table used in the inverse quantization processing circuit 45 is the same as that used in the quantization processing circuit 33. The restored DCT coefficient is subjected to a two-dimensional IDCT transformation in the IDCT processing circuit 46, and thus, the supplementary data D18' is restored, an example of which is shown in FIG. 10. Note, the supplementary data D18' is substantially the same as the supplementary data D18 outputted from the subtractor 31.

The restored supplementary data D18' obtained by the IDCT processing circuit 46 is also inputted to the adder 55, to which the restored expanded image data D12 is inputted from the expansion processing circuit 54. In the adder 55, the supplementary data D18' is added to the restored expanded image data D12 with respect to each of the corresponding components positioned at the same pixel position, and thus the third image data D16' having a high resolution is reproduced. An example of the third image data D16' is shown in FIG. 10.

The third image data D16' is inputted to the image memory 56. When the storing of one frame's worth (or one field's worth) of the third image data D16' in the image memory 56 has been completed, the third image data D16' is sequentially scanned and read out from the image memory 56, and inputted to the D/A convertor 57. The third image data D16' is converted to an analog image signal and outputted to the high resolution image signal output device 58, and thus, an image having a higher resolution in a horizontal direction than that of an image indicated by the output device 55 is shown on the high resolution image signal output device 58.

Thus, in this embodiment, the high resolution image is reproduced by using the first image data D10 generated in the CCD 12 and the second image data D12 generated in the CCD 14, in which the same object image is formed as the CCD 12, and which is provided in such a manner that the corresponding pixels of the CCDs 12 and 14 are offset by a half of distance between the centers of two adjacent pixels.

If a CCD outputting a high resolution image signal is provided, i.e., if a CCD in which a pitch between two adjacent pixels is narrower than those of the CCDs 12 and 14 is provided, two CCDs need not be provided.

Namely, when such a high resolution CCD is provided, the high resolution image signal C outputted from the CCD is subjected to downsampling, so that a normal resolution image data A is obtained. The normal resolution image data A is transformed to a quantized DCT coefficient by the DCT processing circuit 21 and the quantization processing circuit 22. Then, the quantized DCT coefficient is transformed to a normal resolution image data A' by the inverse quantization circuit 24 and the IDCT processing circuit 25, and further, the normal resolution image data A' is subjected to an expansion procedure by the expansion processing circuit 26 to generate a restored expanded image data D12. Then, supplementary data D18 is generated based on the restored expanded image data D12 and the high resolution image signal C, and the supplementary data D18 and the normal resolution image signal A are subjected to data compression, such as a DCT transformation, a quantization and a Huffman encoding process, and recorded to the IC memory card M.

A construction which includes a high resolution CCD does not need the CCD 14, the half-mirror 13, the A/D convertor 16 and the expansion processing circuit 27.

Note, in comparing the embodiment of the device shown in FIGS. 1 and 2 with a device in which a normal resolution image data is generated by subsampling the high resolution image data obtained by a CCD outputting the high resolution image, and the supplementary data is obtained based on the normal resolution image data and the high resolution image data, the statistical characteristics of the supplementary data are different in each device.

On the other hand, although the embodiment shown in FIGS. 1 and 2 is an electronic still camera which can record and reproduce both a normal resolution image and a high resolution image, the present invention can be applied to a record-reproduction device in which high resolution image data is inputted from another device, and which can output both normal resolution image data and high resolution image data.

Namely, in this record-reproduction device, an image data generating device including a CCD, an A/D converter and the like is not provided, and the normal resolution image data is generated based on the high resolution image data. The difference data (i.e., the supplementary data) between the high resolution image data and the normal resolution image data is recorded in a recording medium so that both the normal resolution image data and the high resolution image data can be reproduced.

The supplementary data D18 is used whew the high resolution image data D10 is generated based on the normal resolution image data D10 is recorded in a small recording area of the recording medium M. The reason why the size of the recording area is small is as follows:

The first image data D10 obtained by the CCD 12 and the second image data D14 obtained by the CCD 14 represent the same object, and the expanded image data D12 is generated in accordance with the first image data D10 while the high resolution image data D16 is generated in accordance with the first and second image data D10 and D14. Therefore, the amplitude values of the supplementary data D18 obtained by subtracting the expanded image data D12 from the high resolution image data D16 concentrates on the value "0". Accordingly, the entropy of the supplementary data D18 is small. Therefore, the supplementary data D18 can be encoded with a short code word, and thus, the volume of recording area in which the encoded word corresponding to the supplementary data is recorded is small. Namely, the amount of recorded data in the recording medium is drastically reduced in comparison with a device in which both of the normal resolution image data D10 and the high resolution image data D16 are recorded in the recording medium.

On the other hands the JPEG algorithm includes a hierarchical process in which a progressive build-up indication is carried out. In this hierarchical process, the original image is subjected to downsampling, so that images having a size of $\frac{1}{2}, \frac{1}{4} \ldots \frac{1}{2^n}$ of the original image are generated. The image having the smallest size ($\frac{1}{2^n}$ of the original image) is subjected to a two-dimensional DCT transformation, quantization and Huffman encoding procedure (a DCT system), and thus, encoded data is generated. Then, the encoded data is decoded to generate a restored image having the size of $\frac{1}{2^n}$ of the original image. Then, the restored image is expanded by two times, and thus, the image is changed to an image having a size of $\frac{1}{2^{n-1}}$ of the original image. Supplementary data K(n−1) is obtained based on the image of $\frac{1}{2^{n-1}}$ size and another image which is generated by downsampling the original image and has a size of of $\frac{1}{2^{n-1}}$ of the original image. The supplementary data K(n−1) is transformed to encoded data according to the DCT system.

Such an encoding procedure is repeatedly performed until an image having the same size as the original image is produced, and the encoded data having the smallest size image (corresponding to the encoded data of a basic image or the first image data of the embodiment) is transmitted to a receiving device, in which the basic image is restored based on the encoded data and shown on a display, and using the supplementary data K(p−1) (p=n, n−1, n−2, . . . 1) if necessary, an image having a size of $\frac{1}{2^{p-1}}$ of the original image is restored based on the restored basic image (corresponding to the high resolution image of the embodiment). By repeating such a procedure, an image resolution is increased step by step, and this is called a progressive build-up indication.

In the embodiment, the high resolution image data D16 is obtained based on the first image data D10, which is the basic image, and the second image data D14. The first image data D10 is subjected to the DCT transformation and quantization to transform it to the quantized DCT coefficient, and then the quantized DCT coefficient is restored to image data D10'. The image data D10' is subjected to an expansion process according to the hierarchical process, and thus, the expanded image data D12 is obtained. The supplementary data D18 is the difference between the high resolution image data D16 and the supplementary data D12. The first image data D10 and the supplementary data D18 are DCT-transformed and Huffman-encoded to be recorded to the IC memory card M. These processes of the embodiment is similar to the hierarchical process in which the progressive built-up indication is carried out. Therefore, in the embodiment, the encoded data can be recorded to the IC memory card M according to a communication protocol of the hierarchical process.

Namely, in the hierarchical process of the JPEG algorithm, various kinds of information are added to the encoded data so that the image can be properly restored in the receiving device, and such added information necessary for restoring operation is added to the encoded data A and B' in the embodiment, and recorded to the IC memory card M. The added information includes the quantization table and the Huffman table used in the encoding process. The data format in the hierarchical process is as follows: Namely, one frame in which the encoded data obtained by encoding one frame of image data and one supplementary data is sandwiched by a "SOI" (Start of Image) marker and an "EOI" (End of Image) marker as a basic unit, and the encoded data corresponding to the supplementary data obtained for each step is provided in the frame. Such frames are continuousely arranged. A frame header indicating parameters relating the frame is added in front of the frame.

Therefore, by recording the encoded data A and B' to the IC memory card M according to the hierarchical process, a decoder for the JPEG algorithm can restore the image from data read out from the IC memory card M. Namely, the data recorded to the IC memory card M by the electronic still camera of the embodiment can be transmitted, without modifying the data, to a receiving device by using a communication protocol according to the JPEG algorithm.

Note, since a color image can be encoded in the JPEG algorithm, each color component can be encoded and recorded to the IC memory card M, in a data format according to the hierarchical process, in the embodiment.

Although two images, i.e., the normal resolution image and the high resolution image are recorded to or reproduced from the IC memory card M in the embodiment, further supplementary data may be generated, encoded and recorded to the IC memory card M so that another image, of a higher resolution than the high resolution image, can be reproduced.

Figure 11:
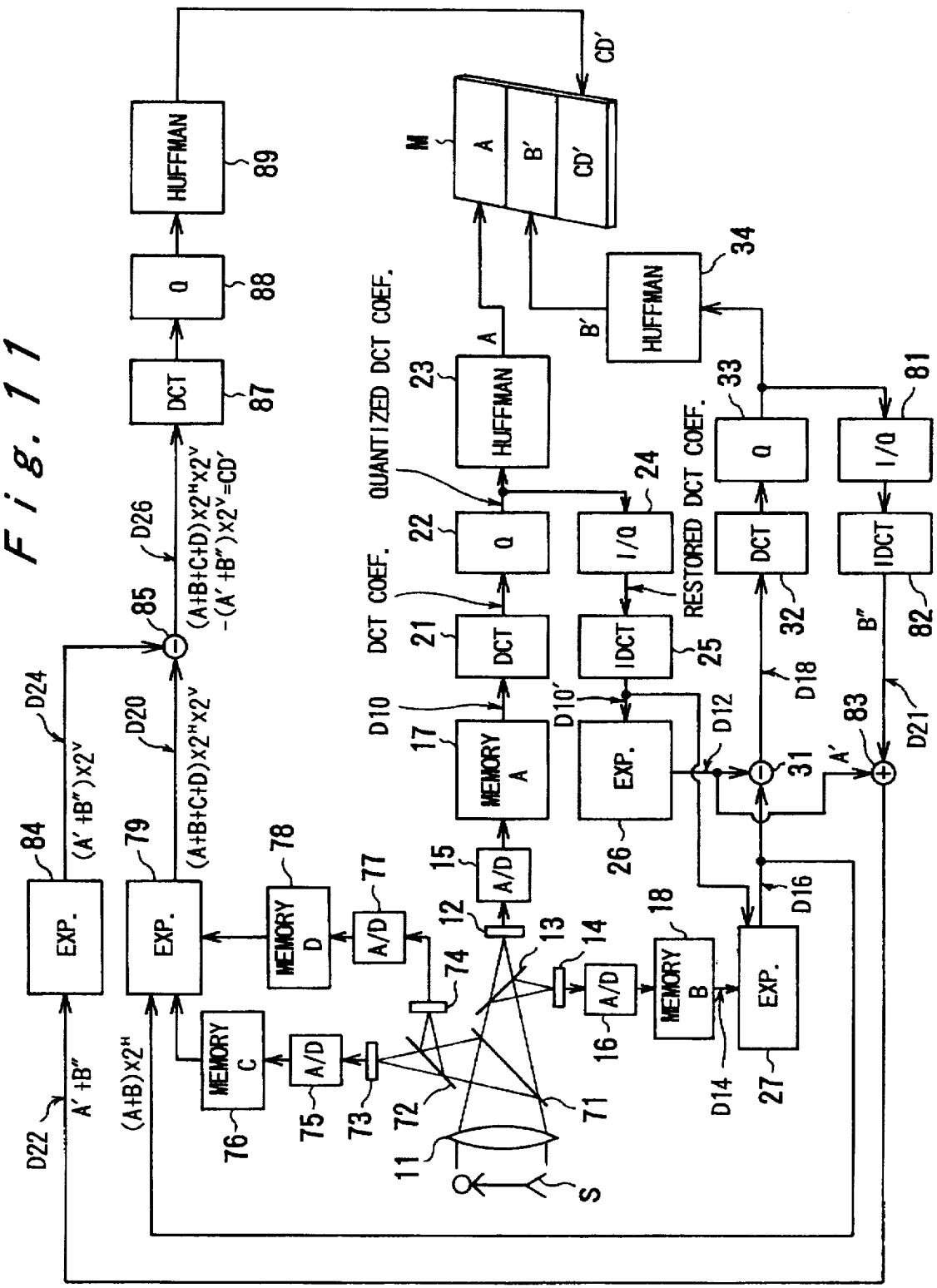
FIG. 11 is a block diagram of a recording system of an electronic still camera to which a second embodiment of the present invention is applied.

FIG. 11 is a block diagram of a recording system of an electronic still camera to which a second embodiment of the present invention is applied. The second embodiment has a construction in which further complementary data is generated and recorded to the IC memory card M in the form of an encoded data, so that a higher resolution image than that in the first embodiment is reproduced. Note, in FIG. 11, the same components as in the first embodiment are indicated by the same reference numbers, and a detailed explanation thereof is omitted.

A half-mirror 71 is provided between the focus lens 11 and the half-mirror 13, so that a part of the light from the object is fed to the half-mirror 13, and the remaining light from the object is fed to a half-mirror 72. The light passing through the half-mirror 72 enters a CCD 73, and the light reflected on the half-mirror 72 enters a CCD 74. Thus, the same image is formed on each of the CCDs 73 and 74 as the CCDs 12 and 14.

The CCDs 73 and 74 are arranged in such a manner that a pixel of the electric conversion element of the CCD 73 and a pixel of the CCD 74 are offset to each other by half the distance between the centers of two adjacent pixels in both a horizontal direction and a vertical direction, respectively, of the image formed on the CCDs 73 and 74.

Image data generated by the CCD 73 is converted to digital image data by an A/D converter 75, and stored in an image memory 76. Similarly, image data generated by the CCD 74 is converted to digital image data by an A/D converter 77, and stored in an image memory 78. One frame's worth (or one field's worth) of image data is read from the image memories 76 and 78, respectively, and inputted into an expansion processing circuit 79. In the expansion processing circuit 79, an upsampling is performed in a horizontal direction of the image data in such a manner that the number of pixels arranged in a horizontal direction is doubled, so that a high resolution image data is obtained. The high resolution image data D16 outputted from the expansion processing circuit 27 is also inputted to the expansion processing circuit 79.

In the expansion processing circuit 79, the the high resolution image data D16 and the high resolution image data obtained based on the image data outputted from the memories 76 and 78 are subjected to an expansion process, so that the number of pixels arranged in a vertical direction is doubled, and thus a second high resolution image data D20 is generated in the expansion processing circuit 79.

On the other hand, the quantized DCT coefficient of the supplementary data outputted from the quantization circuit 33 is subjected to an inverse quantization in an inverse quantization circuit 81, and thus, the quantized DCT coefficient is converted to a DCT coefficient. The DCT coefficient is subjected to a two-dimentional IDCT in an IDCT processing circuit 82, and thus, the supplementary data D21 is restored. In an adder 83, the restored supplementary data D21 is added to the expanded image data D12 inputted from the expansion processing circuit 26, and thus, high resolution image data D22 is restored. This restored high resolution image data D22 is subjected to an expansion process in an expansion processing circuit 84, so that the number of pixels arranged in a vertical direction is doubled, and thus, a third high resolution image data D24 is generated.

In a subtractor 85, the third high resolution image data D24 is subtracted from the second high resolution image data D20, and thus, second supplementary data D26 is obtained. The second supplementary data D26 is subjected to the DCT transformation in a DCT processing circuit 87, and then subjected to the quantization in a quantization processing circuit 88. The quantized DCT coefficient obtained by the quantization processing circuit 88 is Huffman-encoded in a Huffman encoding processing circuit 89, and recorded to the IC memory card M as the encoded data CD'.

Based on the image data A and the supplementary data B' and CD' read from the IC memory card M, an image in which the resolution is increased by two times in both the horizontal direction and the vertical direction is obtained. Namely, a higher resolution image than that in the first embodiment is reproduced. Thus, by increasing the number of the CCDs by two times, the resolution of the image is improved.

FIG. 12 shows upsampling in a horizontal direction and a vertical direction. In the example, first, image data is subjected to upsampling so that the number of pixels is doubled in the horizontal direction, and thus, image data A is obtained. Then, the image data A expanded in the horizontal direction is subjected to upsampling so that the number of pixels is doubled in the vertical direction, and thus, image data A' is obtained.

In the other example in FIG. 12, image data Axy obtained by the CCD 12 and image data Bxy obtained by the CCD 14 are subjected to upsampling in such a manner that each of the data αxy and βxy is obtained in an arbitrary manner, in which a mean value of adjacent Axy and Bxy data is calculated, for example.

Note, for transforming the original image data from a spatial coordinate axis to a spatial frequency axis, it is possible to use other orthogonal transformations such as Fourier transformation, Hadamard's transformation, Harr transformation, etc. in place of the discrete cosine transformation.

Further, as for the orthogonal transformation and the encoding procedure for quantizing orthogonal transformation coefficients, although the Huffman encoding is used in the above embodiment, another entropy encoding method such as an arithmetic encoding method can be used.

Furthermore, the size of the block of the first image data D10 is not restricted to 8×8 pixels.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 5-197993 (filed on Jul. 15, 1993) which is expressly incorporated herein, by reference, in its entirety.

I claim:

1. A device for processing an image signal, comprising:

first means for generating first image data based on an optical image, said first image data having a first resolution;

second means for generating second image data based on said optical image, said second image data being offset from said first image data by a predetermined amount on a spatial coordinate axis;

third means for generating third image data based on said first and second image data, said third image data having a second resolution higher than said first resolution;

means for transforming said first image data to an expanded image data having a number of pixels equal to a number of pixels of said third image data;

means for subtracting said expanded image data from said third image data to generate supplementary data;

means for applying data compression to said first image data and said supplementary data; and means for recording said first image data and said supplementary data compressed by said data compression means to a recording medium.

2. A device according to claim 1, wherein said data compression applying means comprises:

means for applying an orthogonal transformation to said first image data and said supplementary data to obtain orthogonal transformation coefficients of said first image data and said supplementary data;

means for quantizing said orthogonal transformation coefficients to obtain quantized orthogonal transformation coefficients; and means for encoding said quantized orthogonal transformation coefficients to obtain encoded data.

3. A device according to claim 2, wherein said orthogonal transformation applied by said orthogonal transformation applying means comprises a discrete cosine transformation, and said encoding performed by said encoding means comprises a Huffman encoding.

4. A device according to claim 2, further comprising:

means for applying an inverse-quantization to said orthogonal transformation coefficients of said first image data; and means for applying an inverse-orthogonal transformation to said orthogonal transformation coefficients of said first image data to obtain restored image data;

said third generating means generating said third image data based on said restored image data and said second image data.

5. A device according to claim 2, further comprising:

means for applying an inverse-quantization to said orthogonal transformation coefficient of said first image data; and means for applying an inverse-orthogonal transformation to said orthogonal transformation coefficient of said first image data to obtain restored image data;

said transforming means transforming said restored image data to said expanded image data.

6. A device according to claim 2, further comprising:

means for decoding said encoded data to obtain restored quantized orthogonal transformation coefficients of said first image data and said supplementary data;

means for inverse-quantizing said restored quantized orthogonal transformation coefficients to obtain restored orthogonal transformation coefficients of said first image data and said supplementary data;

means for applying an inverse-orthogonal transformation to said restored orthogonal transformation coefficients to restore said first image data and said supplementary data;

means for outputting said restored first image data to a first display device showing an image at said first resolution;

means for transforming said restored first image data to restored expanded image data having a number of pixels equal to a number of pixels of said third image data;

means for reproducing said third image data based on said restored expanded image data and said restored supplementary data; and means for outputting said restored third image data to a second display device showing an image at said second resolution.

7. A device according to claim 1, wherein said first and second generating means comprise charge coupled devices on which optical images are formed, respectively, said second generating means being offset from said first generating means by half a distance between the centers of two adjacent pixels in a horizontal direction of said optical image, and said third generating means arranging said first and second image data in a horizontal direction in a predetermined manner to generate said third image data.

8. A device according to claim 1, wherein said transforming means performs an upsampling on said spatial coordinate axis in such a manner that, in said expanded image data, the value of a pixel is defined as a mean value of two adjacent pixels.

9. A device according to claim 1, wherein said subtracting means performs a subtraction with respect to each corresponding pixel of said expanded image data and said third image data.

10. A device according to claim 1, wherein said first and second generating means comprise charge coupled devices on which optical images are formed, respectively, said second generating means being offset from said first generating means by half a distance between the centers of two adjacent pixels in a vertical direction of said optical image, said third generating means arranging said first and second image data in said vertical direction in a predetermined manner to generate said third image data.

11. A device according to claim 1, further comprising:

means for reading said first image data and said supplementary data recorded to said recording medium in such a manner that said first image data and said supplementary data are expanded and restored;

means for outputting said restored first image data to a display device showing an image at said first resolution;

means for transforming said restored first image data to restored expanded image data having a number of pixels equal to said third image data; and means for reproducing said third image data based on said restored expanded image data and said restored supplementary data.

12. A device according to claim 1, wherein said image signal processing device is provided in an electronic still camera.

13. A device for processing an image signal, comprising:

an image sensor for generating an image signal corresponding to a subject, said image sensor outputting image data corresponding to said subject;

an A/D converter for A/D converting said image data to generate a first image data and second image data, each of which has a first resolution, and which are offset to each other by a predetermined amount in a spatial coordinate axis of said original image data;

a first expansion circuit for generating third image data based on said first and second image data, said third image data having a second resolution higher than said first resolution;

a second expansion circuit for performing an expansion process to transform said first image data to expanded image data having a number of pixels equal to said third image data;

a subtractor for substracting said expanded image data from said third image data to generate supplementary data;

a data compression circuit for applying data compression to said first image data and said supplementary data; and a recording medium to which said first image data and said supplementary data compressed by said recording means are recorded.

14. A device according to claim 13, further comprising:

a data expansion circuit for reading said first image data and said supplementary data recorded to said memory in such a manner that said first image data and said supplementary data are expanded and restored;

a first D/A converter for D/A converting said restored first image data to analog first image data and outputting said analog first image data to a display device showing an image at said first resolution;

a third expansion circuit for performing an expansion process to transform said restored first image data to restored expanded image data having a number of pixels equal to said third image data;

an adder for adding said restored supplementary data to said restored expanded image data to reproduce said third image data;

a second D/A converter for D/A converting said reproduced third image data and outputting said analog third image data to a display device showing an image at said second resolution.

15. A device for processing an image signal including first image data and supplementary data, which are subjected to an orthogonal transformation, a quantization and an encoding, and recorded to a recording medium, said first image data having a first resolution, said image signal processing device comprising:

means for decoding the encoded data recorded on said recording medium to obtain restored quantized orthogonal transformation coefficients of said first image data and said supplementary data;

means for inverse-quantizing said restored quantized orthogonal transformation coefficients to obtain restored orthogonal transformation coefficients of said first image data and said supplementary data;

means for applying an inverse-orthogonal transformation to said restored orthogonal transformation coefficients to restore said first image data and said supplementary data;

means for transforming said restored first image data to restored expanded image data;

means for reproducing a third image data based on said restored expanded image data and said restored supplementary data; and means for outputting said restored third image data to a second display device showning an image at a second resolution higher than said first resolution.

16. A device according to claim 15, further comprising:

means for determining whether said supplementary data is recorded to said recording medium, said reproducing means reproducing said third image data according to recognition information.

* * * * *